(12) United States Patent
Nakao (10) Patent No.: US 8,023,088 B2
(45) Date of Patent: Sep. 20, 2011

(54) LIQUID CRYSTAL DISPLAY DEVICE AND MANUFACTURING METHOD OF THE LIQUID CRYSTAL DISPLAY DEVICE

(75) Inventor: Hajime Nakao, Azumino (JP)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 12/258,804

(22) Filed: Oct. 27, 2008

(65) Prior Publication Data

US 2009/0141229 A1 Jun. 4, 2009

(30) Foreign Application Priority Data

Nov. 29, 2007 (JP) ................................. 2007-308534

(51) Int. Cl.
*G02F 1/1343* (2006.01)
(52) U.S. Cl. ............................ 349/143; 349/139; 349/43
(58) Field of Classification Search .................... 349/42, 349/43, 139, 143, 149
See application file for complete search history.

(56) References Cited

U.S. PATENT DOCUMENTS

2008/0043196 A1* 2/2008 Fujita ............................ 349/152

FOREIGN PATENT DOCUMENTS

| JP | 2001-235763 | 8/2001 |
|---|---|---|
| JP | 2001-283540 | 10/2001 |
| JP | 2002-182230 | 6/2002 |
| JP | 2007-226175 | 9/2007 |

* cited by examiner

*Primary Examiner* — Sarah Hahm
(74) *Attorney, Agent, or Firm* — K&L Gates LLP (57) ABSTRACT

A manufacturing method for a horizontal electric field type liquid crystal display device of fringe field switching (FFS) or the like mode whereby pixel electrodes and a common electrode are disposed opposing each other on a planarization layer with an insulator interposed, includes a step whereby a planarization layer 18 is formed that has openings formed therein at the positions where contact holes 21*a* are to be formed in the surface of a passivation layer 17, and the portions of such planarization layer at the periphery of the display area are removed, followed by a step whereby the exposed portions of the passivation layer 17 are removed using a fluorine etching gas. By employing such method, the size of the contact hole 21*a* mouths can be rendered smaller, and also the number of manufacturing processes can be reduced, compared to the related art.

2 Claims, 12 Drawing Sheets

TFT PORTION

CONNECTION-SWITCHING LINE PORTION

LIQUID CRYSTAL DISPLAY DEVICE AND MANUFACTURING METHOD OF THE LIQUID CRYSTAL DISPLAY DEVICE

BACKGROUND

1. Technical Field

The present invention relates to a horizontal electric field type liquid crystal display device using an fringe field switching (FFS) or the like mode whereby pixel electrodes and a common electrode are disposed opposing each other on a planarization layer with an insulator interposed and a method for manufacturing such device.

2. Related Art

Many of the liquid crystal display devices in use are of the vertical electric field type which has a pair of transparent substrates with electrodes and so on formed on their surfaces and a liquid crystal layer that is sandwiched between the pair of substrates, and displays various kinds of information by rearranging the liquid crystals via application of voltage to the electrodes on the two substrates. Such vertical electric field type liquid crystal display devices are generally twisted nematic (TN) mode, but since this has the problem of a narrow viewing angle, various improved vertical electric field type liquid crystal display devices with vertical alignment (VA) mode, multidomain vertical alignment (MVA) mode or the like have been developed.

On the other hand, liquid crystal display devices that, unlike the vertical electric field type liquid crystal display devices described above, are in-plane switching (IPS) mode or FFS mode, whereby electrode pairs constituted of a pixel electrode and a common electrode are provided on one of the substrates only, are also known.

Of these, the IPS mode liquid crystal display device deploys the electrode pairs on the same layer, and makes the direction of the field that is applied to the liquid crystal almost parallel with the substrates, so as to rearrange the liquid crystal molecules in a direction parallel with the substrates. Therefore, the IPS mode liquid crystal display device is also called a horizontal electric field type liquid crystal display device, and has the advantage of providing a viewing angle that is extremely broad in comparison to the vertical electric field type liquid crystal display devices described above. With the IPS mode liquid crystal display device however, because the electrode pairs are provided on the same layer in order to apply an electric field to the liquid crystal, there is the problem that the liquid crystal molecules, which are positioned above the pixel electrode, are inadequately driven, and this results in lowering of the transmittivity and other aspects.

What might be termed diagonal electric field type FFS mode liquid crystal display devices have been developed (see JP-A-2001-235763 and JP-A-2002-182230) in order to resolve the problems of the IPS mode liquid crystal display device. In such FFS mode liquid crystal display devices, the pixel electrodes and common electrodes for applying the electric field to the liquid crystal layer are disposed in differing layers, each with an insulator interposed.

Such FFS mode liquid crystal display device has a broader viewing angle and higher contrast than the IPS mode liquid crystal display device, and furthermore can be driven with low voltage, as well as having higher transmittivity. Thus it has the feature of enabling bright displays. In addition, with the FFS mode liquid crystal display device there is also the advantage that the area of overlap, viewed from above, between the pixel electrodes and common electrodes, is larger than in the IPS mode liquid crystal display device, which has the side-effect that a larger auxiliary capacitance is generated and there is no need to specially provide an auxiliary capacitance wire.

However, with the FFS mode liquid crystal display devices disclosed in JP-A-2001-235763 and JP-A-2002-182230, there is the problem that, because the portions of the pixel electrodes that overlie the TFT elements and common electrode line have an irregular form, in other words a form with multilevels, misalignment of the liquid crystal molecules occurs at such multilevel portions, so that such multilevel portions constitute regions that essentially do not contribute to the display, and therefore the aperture ratio falls. An approach that is practiced to address such problem is to employ a planarization layer such as is used in the VA type or MVA type liquid crystal display devices mentioned earlier, and to dispose the pixel electrodes, common electrodes and so forth on such planarization layer, in order to eliminate the formation of multilevels in the surfaces of the pixel electrodes that overlie the switching elements, common wire and so forth (see JP-A-2001-283540 and JP-A-2007-226175).

Nevertheless, with the FFS mode liquid crystal display devices disclosed in JP-A-2001-283540 and JP-A-2007-226175, after formation of the regular TFT elements, common electrode line and so forth, a planarization layer constituted of photosensitive material, for the purpose of planarizing, is formed and the first electrodes, inter-electrode insulator and second electrodes are formed on the surface of such planarization layer. Therefore the problem arises that, compared with earlier FFS mode liquid crystal display devices that do not use a planarization layer, the number of photolithographic, layer-forming and dry etching process increases, so that more processes are needed for manufacturing, with the result that productivity falls. In addition, because photolithographic and etching methods are employed to form contact holes in the passivation layer via the contact holes formed in the planarization layer, the width of the contact hole mouths is large, so that the opening of the liquid crystal display device obtained is low.

SUMMARY

An advantage of some aspects of the present invention is to provide an FFS or other mode horizontal electric field type liquid crystal display device that raises productivity by reducing manufacturing processes and that moreover has large opening enabling bright displays.

According to a first aspect of the present invention, a liquid crystal display device includes: a liquid crystal layer; and a pair of transparent substrates that enclose the liquid crystal layer; wherein the liquid crystal face of one of such pair of transparent substrates being provided with: multiple scan lines and signal lines that are formed in matrix layouts in a display area; switching elements that are provided near intersections of the multiple scan lines and signal lines; a first insulator that covers surfaces of the switching elements; a planarization layer that is formed over the entire surface of the display area; first electrodes, and second electrodes with multiple slits, that are constituted of transparent electrically conductive material and are disposed opposing each other on the planarization film with a second insulator interposed; and a lower wire and an upper wire that are constituted of the same material as the scan lines and the signal lines respectively and that are formed at peripheral portions of the display area; wherein the switching elements are covered by the first insulator and moreover the upper wire is covered by the second insulator.

With such liquid crystal display device of the invention, the display area may have multiple scan lines and signal lines each formed in a matrix layout, and may also have lower-level first electrodes, and higher-level second electrodes with multiple slits, such sets of electrodes each being constituted of a transparent conductive material, and being formed opposing each other in the spaces enclosed by scan lines and signal lines, over a planarization layer with a second insulator interposed. Thanks to such structure, such liquid crystal display device of the invention can be made to operate as an FFS mode liquid crystal display device. Indium tin oxide (ITO) or indium zinc oxide (IZO) can be used as the transparent conductive material. Also, the first electrodes and second electrodes can be formed either from material of the same composition or from materials of differing composition.

Moreover with such liquid crystal display device of the invention, the first electrodes, and the second electrodes with multiple slits, both constituted of a transparent conductive material and disposed opposing each other with the second insulator interposed, are formed over the planarization layer, which means that no multilevels due to switching elements, common wiring or the like occur in either the first electrodes or the second electrodes. As a result, with such liquid crystal display device of the invention the spacing between the higher-level second electrodes and the other substrate—in other words the cell gap—will be uniform, and furthermore, the area of the regions within the display area where light must be blocked by black matrixes will be reduced, so that the aperture ratio will be large.

Films constituted of silicon oxide or silicon nitride can be used for the first and second insulators, which may be either single-layer or multiple-layer. From the viewpoint of insulation quality, silicon nitride will be preferable. But the second insulator will preferably be formed at lower temperature than the first insulator, so that the surfaces of the first insulator and the planarization layer will not roughen. Also, as the switching elements in such liquid crystal display device of the invention, use could be made of three-terminal elements, of which typical examples are low temperature poly silicon (LTPS) type thin film transistors (TFTs) and amorphous silicon (a-Si) type TFTs, or two-terminal type nonlinear elements, of which thin film diodes (TFDs) are a typical example.

Also, in such liquid crystal display device of the invention, the first electrodes formed on the planarization layer may be electrically connected to electrodes of the switching elements via first contact holes, and the second electrodes may be formed over the whole of the display area and moreover be electrically connected to a common wire formed at the peripheral portions of the display area.

With such liquid crystal display device of the invention, the first electrodes, being connected to the electrodes of the switching elements, will function as pixel electrodes, and the second electrodes, being electrically connected to the common wire at the peripheral portions of the display area, will function as common electrodes.

Also, such liquid crystal display device of the invention may have a connection-switching line for electrically connecting the lower wire and the upper wire, the connection-switching line being formed from transparent conductive material of the same composition as the second electrodes, and moreover extending over the surface of the second insulator and electrically connecting the upper wire and the lower wire via second contact holes formed in the second insulator laid over the upper wire and third contact holes formed in the first and second insulators laid over the lower wire.

In such liquid crystal display device of the invention, the upper wire formed at the periphery of the display area, and the surface of the first insulator, are covered by the second insulator. Also, the connection-switching line is formed from transparent conductive material of the same composition as the second electrodes, and moreover extends over the surface of the second insulator and electrically connects the upper wire and lower wire via the second contact holes formed in the second insulator laid over the upper wire and the third contact holes formed in the second insulator and first insulator laid over the lower wire. Thanks to possessing such structure, such liquid crystal display device of the invention can, by means of the manufacturing method therefore to be described hereafter, be manufactured with a small number of manufacturing processes compared with the related art. The lower wire is formed simultaneously with formation of the scan lines in the display area, and therefore is sometimes termed the "gate wire", using the name of the electrodes of the TFTs that serve as the switching elements. Likewise, the upper wire is sometimes termed the "source wire" since it is formed simultaneously with formation of the signal lines in the display area.

More precisely, in the liquid crystal display devices of the related art too, lower and upper wires are generally formed at the periphery of the display area, and a connection-switching line is formed for switching between connection of the upper wire and lower wire as appropriate. As regards the manufacturing processes, the connection-switching line in the case of the related art is formed from transparent conductive material of the same composition as the first electrodes, and moreover is formed below the second insulator. Thus, the liquid crystal display device of the invention and the liquid crystal display devices of the related art can be distinguished at least by the fact that with the invention the connection-switching line is formed on the surface of the second insulator, whereas with the related art it is formed below the second insulator.

According to a second aspect of the invention, a method for manufacturing a liquid crystal display device includes steps (1) to (9) below.

(1) A step whereby a first transparent substrate is prepared that has: multiple scan lines and signal lines that are formed in matrix layouts in the display area; switching elements that are provided near intersections of the multiple scan lines and signal lines; a lower wire and an upper wire that are formed along a periphery of the display area, the lower wire being formed from the same material as a common wire and scan lines, and the upper wire being formed from the same material as the signal lines; and a first insulator that covers a surfaces of at least the scan lines, signal lines, switching elements, common wire and upper wire.

(2) A step whereby a planarization layer constituted of photosensitive resin is formed over the entire surface of the first insulator, and by means of exposure and development, openings are formed in the planarization layer at positions corresponding to the electrodes of the switching elements, and also the planarization layer at the display area's periphery is removed.

(3) A step whereby the planarization layer is masked and the first insulator inside the opening is removed so as to form first contact holes, and also the first insulator at the display area's periphery is removed.

(4) A step whereby first electrodes constituted of a transparent conductive material are formed in the spaces enclosed by the scan lines and signal lines, on the surface of the planarization layer.

(5) A step whereby a second insulator is formed over the entire surface of the transparent substrate obtained in step (4).
(6) A step whereby second contact holes are formed at the periphery of the display area.
(7) A step whereby a layer constituted of a transparent conductive material is formed over the entire surface of the transparent substrate obtained in step (6), then second electrodes having multiple slits are formed therein.
(8) A step whereby a second transparent substrate is disposed so as to oppose, at a particular distance apart, the surface of the first transparent substrate obtained in step (7), the first and second substrates are bonded together, and the space therebetween is filled with liquid crystal.

Steps (1) and (2) of the manufacturing method for the liquid crystal display device of the invention are the same as in the manufacturing process for the liquid crystal display devices of the related art. Subsequently in the manufacturing process for the liquid crystal display devices of the related art, photolithography and etching are used on the portions of the first insulator that are exposed inside the opening formed in the planarization layer, thereby forming opening in the first insulator. In such manufacturing process, the fact that photolithography is used on the opening in the planarization layer means that the size of the opening formed in the planarization layer must be made large to allow for a margin for mask superpositioning error. Hence, with the manufacturing process of the related art, a multilevel arises between the opening in the planarization layer and the opening in the first insulator, and also the dead space constituted by the mouth portions of the contact holes formed by the two sets of opening is large, so that the area of the portions that can be utilized for the display is small. Also, with the manufacturing process of the related art, a step for removing the surrounding photoresist is required after formation of the opening in the first insulator.

By contrast, in step (3) of the manufacturing method for the liquid crystal display device of the present invention, the opening in the first insulator are formed by using a first etching gas to selectively remove the exposed portions of the first insulator, and the first contact holes are formed from the opening in the planarization layer and the openings in the first insulator. The plasma etching method can be used in step (3), and as the first etching gas, use could be made of fluorine gas, of which typical examples are $SF_6$ and $CF_4$, in common use as plasma etching gas for etching of silicon-based compounds. Since the planarization layer will act as a mask during etching of the first insulator, the opening in the planarization layer and the opening formed in the first insulator will be joined continuously, and no multilevel will occur between the opening in the planarization layer and the opening formed in the first insulator. Moreover, since with step (3) there is no need—which there is in the manufacturing process of the related art—to take account of mask superpositioning error in the photolithographic process that forms the contact holes, the size of the opening that are formed in the planarization layer can be made small. Further, there is no need for the photolithographic process and the process for peeling away the resist layer that are necessary with the manufacturing process of the related art. With the method for manufacturing the liquid crystal display device of the invention, the first insulator at the periphery of the display area is also etched away in step (3).

Next in the method for manufacturing the liquid crystal display device of the invention, in step (4), first electrodes constituted of a transparent conductive material are formed in the spaces enclosed by the scan lines and signal lines, on the surface of the planarization layer, and also, electrical continuity is effected between the first electrodes and the switching elements via the first contact holes. As a result, the first electrodes function as pixel electrodes. After that, in step (5), a second insulator is formed over the entire surface of the transparent substrate. This second insulator is also termed the inter-electrode insulator, and is usually formed at a lower temperature than the manufacturing process for the first insulator, so that the surfaces of the first electrodes and the planarization layer will not roughen. In the interest of insulation quality, it will be advisable to use a layer constituted of silicon nitride as the second insulator. In this step, both of all also the surfaces of the first electrodes inside the first contact holes and the exposed surfaces at the periphery of the display area will be covered by the second insulator.

Next, in step (6), a photo resist layer is formed by means of photolithographic method so that the second insulator is exposed at the respective portions of the lower wire, upper wire and common wire where the contact holes are to be formed. Then in step (7) the first etching gas is used to etch away the exposed second insulator portions so as to form second to fourth contact holes in the second insulator over the lower wire, upper wire and common wire, respectively, after which, the photoresist layer is removed in a resist peeling process. For the foregoing step (7), the plasma etching method can be used and the same type of gas was used in step (3) can be used as the first etching gas.

Next in the method for manufacturing the liquid crystal display device of the invention, in step (8), a layer constituted of transparent conductive material is formed over the entire surface of the transparent substrate. Then etching is performed which:
(a) forms second electrodes with multiple slits therein in the spaces delimited by the multiple scan lines and signal lines,
(b) electrically connects the second electrodes to the common wire via the fourth contact holes at the periphery of the display area,
(c) forms a connection-switching line extended over the surface of the second insulator, thereby electrically connecting the upper wire and lower wire via the second contact holes above the lower wire and the third contact holes above the upper wire.

Thus, in step (8), formation of the multiple slits for producing a fringe field effect in the second electrodes is executed simultaneously with connection of the second electrodes to the common wire, and with formation of the connection-switching line for electrically connecting the lower and upper wire. Being connected to the common wire, the second electrodes function as common electrodes. Finally, the liquid crystal display device of the invention is completed by undergoing the above-mentioned step (9), which is similar to that in the related art.

Thus, with the method for manufacturing the liquid crystal display device of the present invention, at least the photolithographic process and photo resist peeling process are unneeded in step (3), in contrast to the liquid crystal display device manufacturing processes of the related art, and consequently the manufacturing efficiency is improved. The structures of a liquid crystal display device fabricated by employing the manufacturing method of the invention and one fabricated by employing the manufacturing method of the related art differ in at least respects (a) to (c) below.

(a) The connection-switching line is formed from transparent conductive material of the same composition as the second electrodes in one aspect of the invention, whereas in the related art it is formed from transparent conductive material of the same composition as the first electrodes.

(b) The connection-switching line is formed on the surface of the second insulator in one aspect of the invention, whereas in the related art it is formed below the second insulator.

(c) No multilevel occurs in the first electrodes inside the first contact holes in one aspect of the invention, whereas in the related art such multilevel does occur.

With the manufacturing method for the liquid crystal display device of the invention, a fluorine gas, of which typical examples are $SF_6$ and $CF_4$, in common use as plasma etching gas for etching of silicon-based compounds, can be used as the first etching gas. Conditions will be selected and applied under which, using such fluorine etching gas, the silicon nitride, silicon oxide or other silicon-based compound will be etched selectively while the planarization layer, drain electrodes and source wires will not be susceptible to being etched.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment of the invention will now be described with reference to the accompanying drawings and using a comparative example. It should be understood however that the embodiment below is intended by way of an example of an FFS mode liquid crystal display device that carries out the technical concepts of the invention, not by way of limiting the invention to this particular FFS mode liquid crystal display device. The invention could equally well be adapted to yield other embodiments within the scope and spirit of the claims. Note also that in the various accompanying drawings referred to herein, the scale of the depictions of individual layers and elements, etc., is varied in order to render them into sizes that are visually distinguishable in the drawings, and such layers and elements, etc., are not necessarily depicted in proportion to their actual dimensions.

Figure 1:
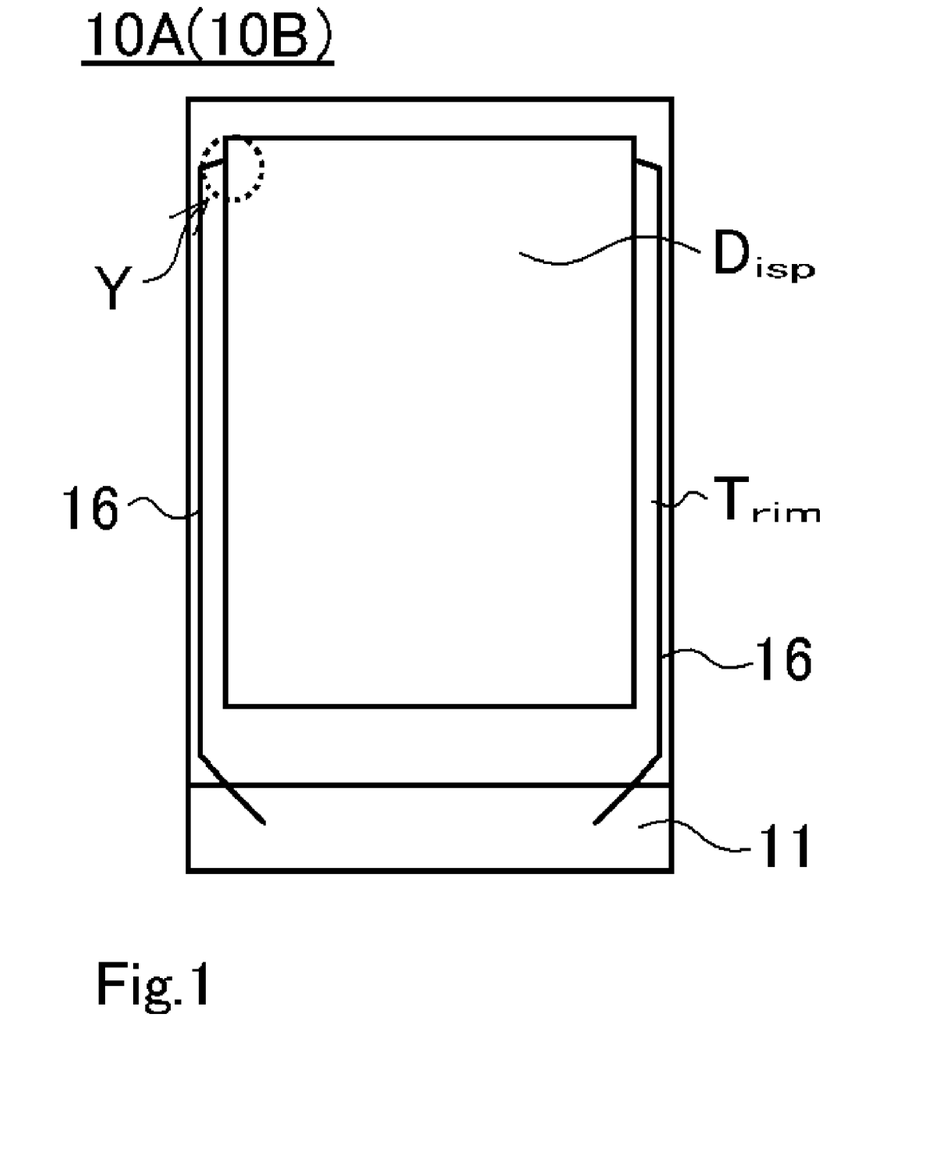
FIG. 1 is a drawing illustrating a position, common to an embodiment and a comparative example, of a connection between a common wire and common electrodes in a liquid crystal display device.
Figure 2:
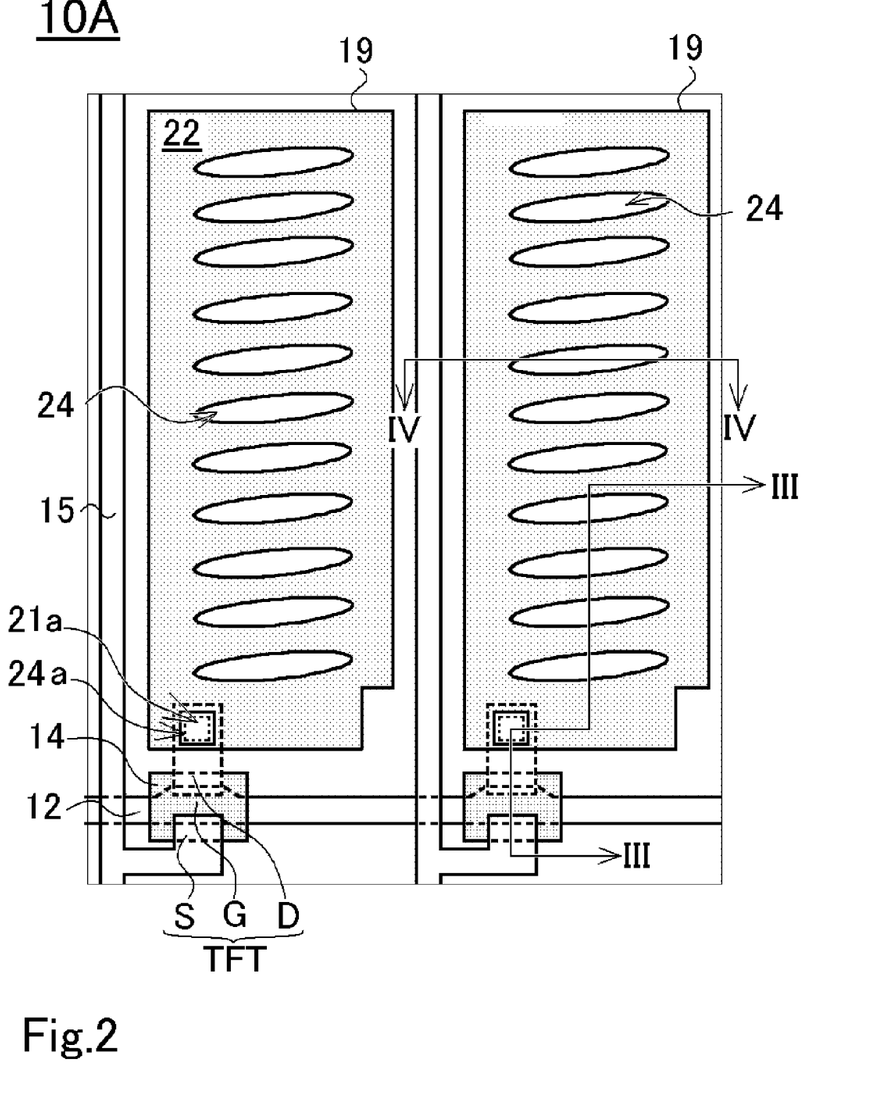
FIG. 2 is a schematic plan view of two pixels of an array substrate in the liquid crystal display device of the embodiment.
Figure 3:
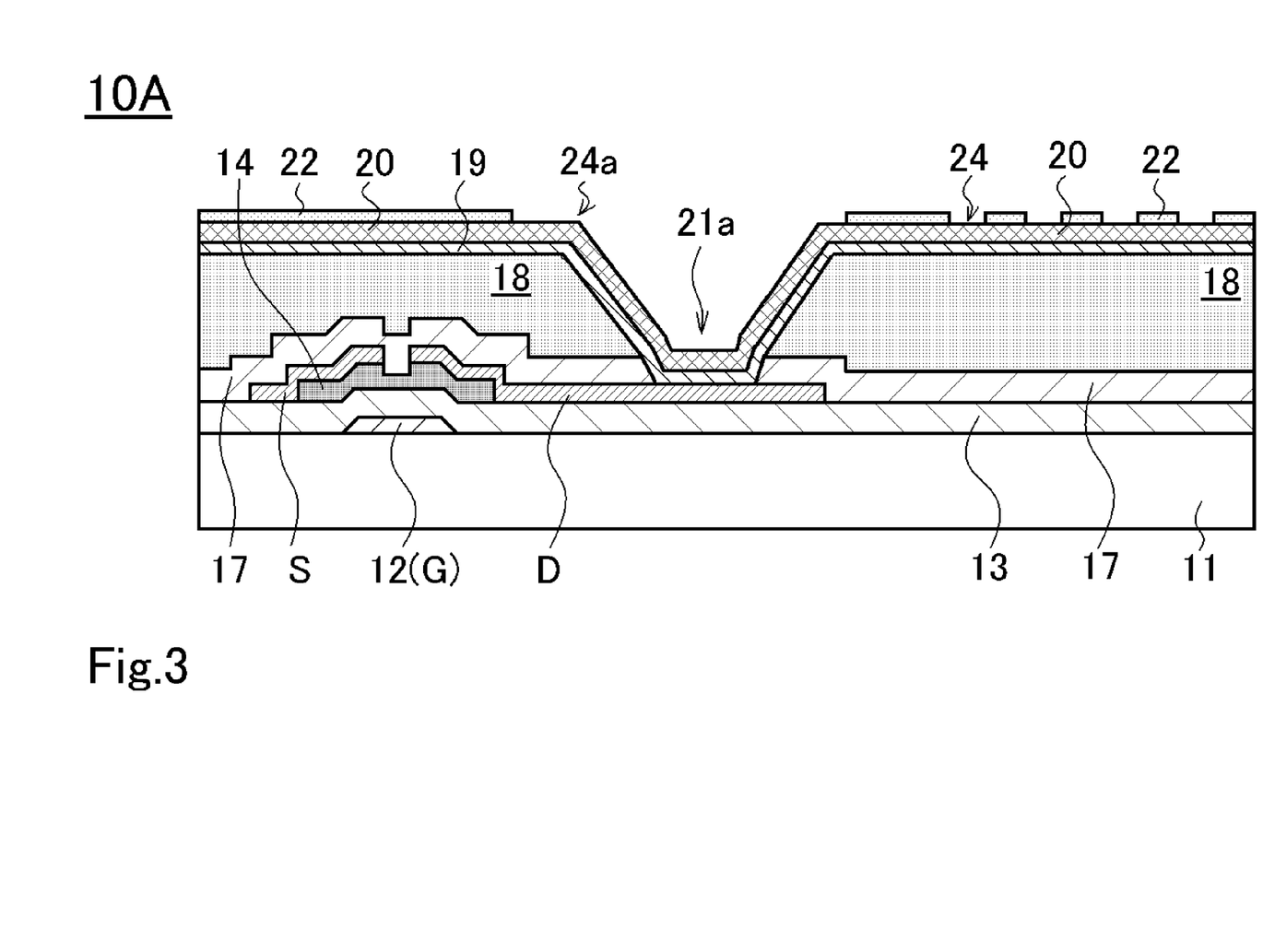
FIG. 3 is a schematic cross-sectional view along line III-III in FIG. 2.
Figure 4:
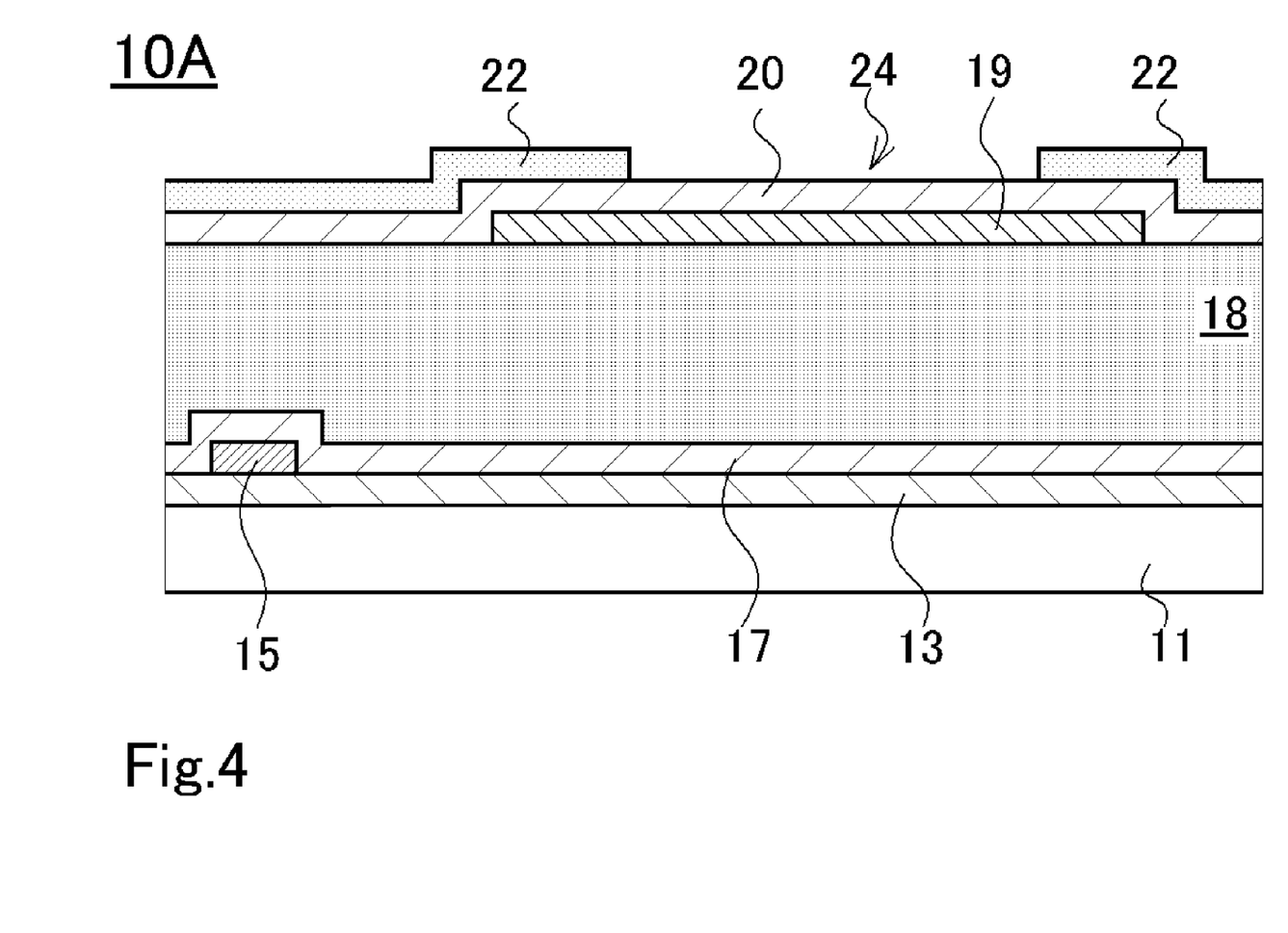
FIG. 4 is a schematic cross-sectional view along line IV-IV in FIG. 2.
Figure 5A:
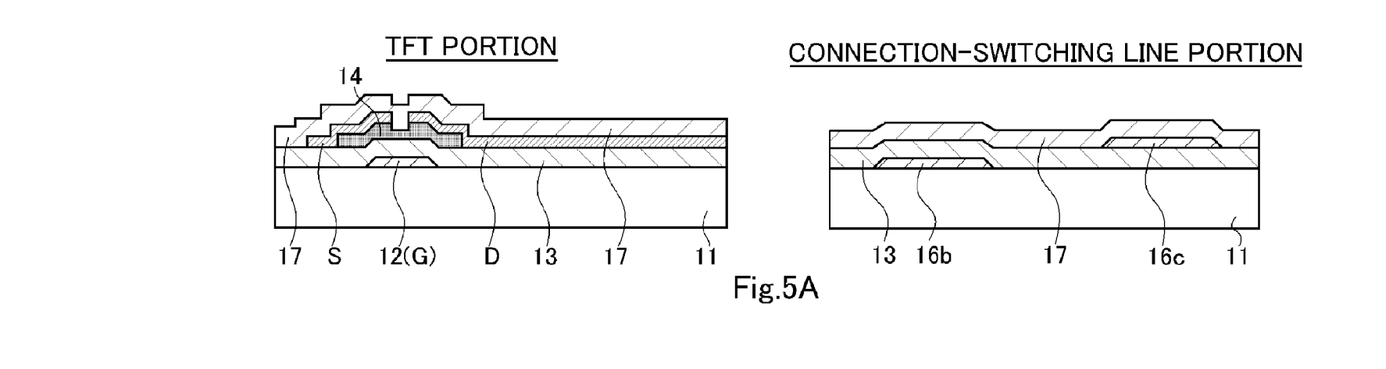
FIGS. 5A to G are cross-sectional views of a TFT portion and a common wire portion after undergoing various steps in the embodiment.
Figure 5B:
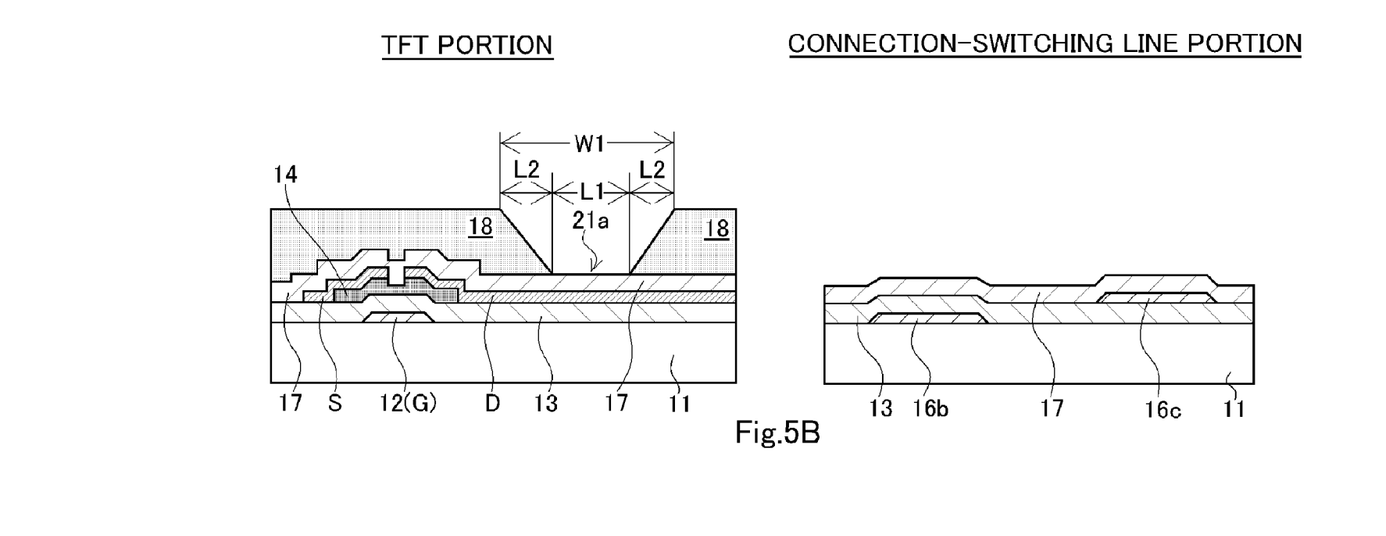
Figure 5C:
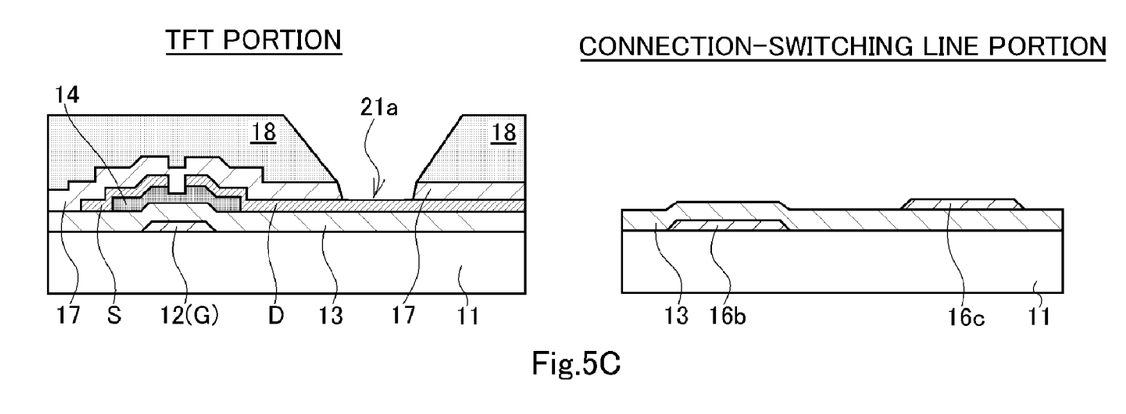
Figure 5D:
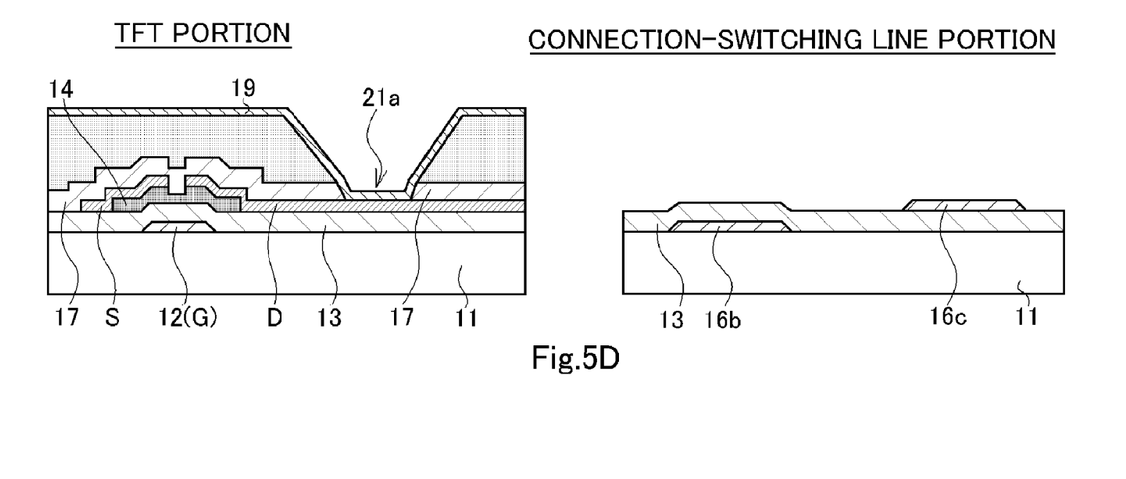
Figure 5E:
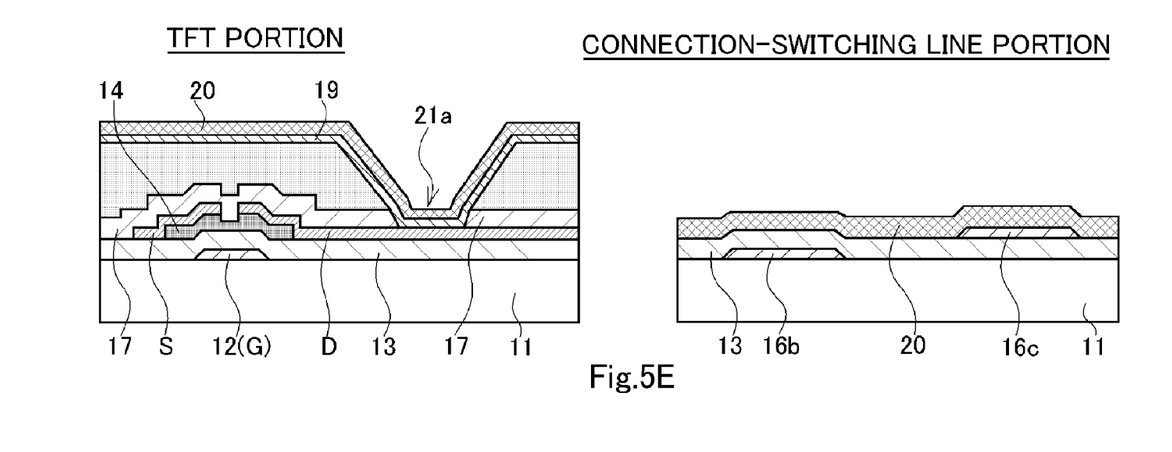
Figure 5F:
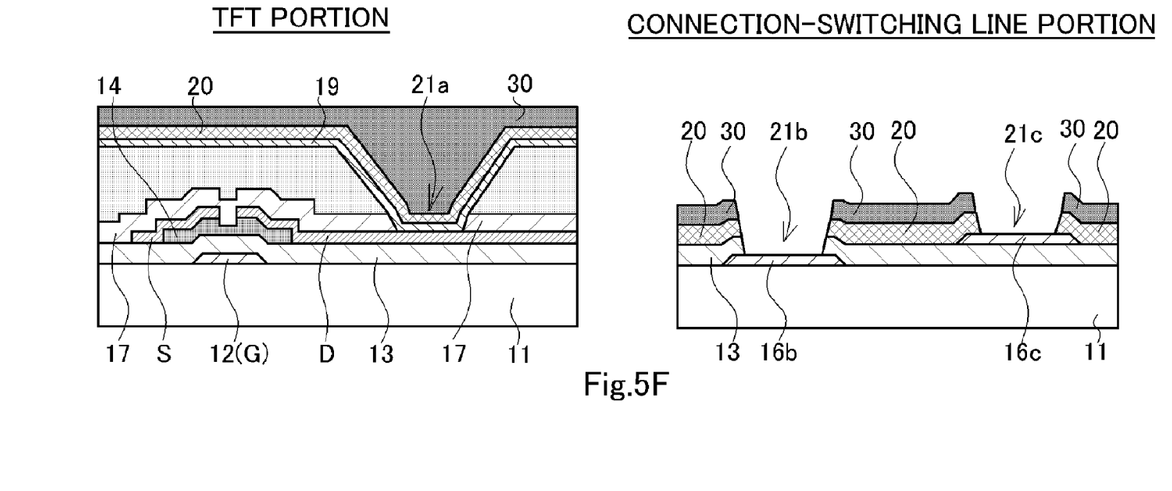
Figure 5G:
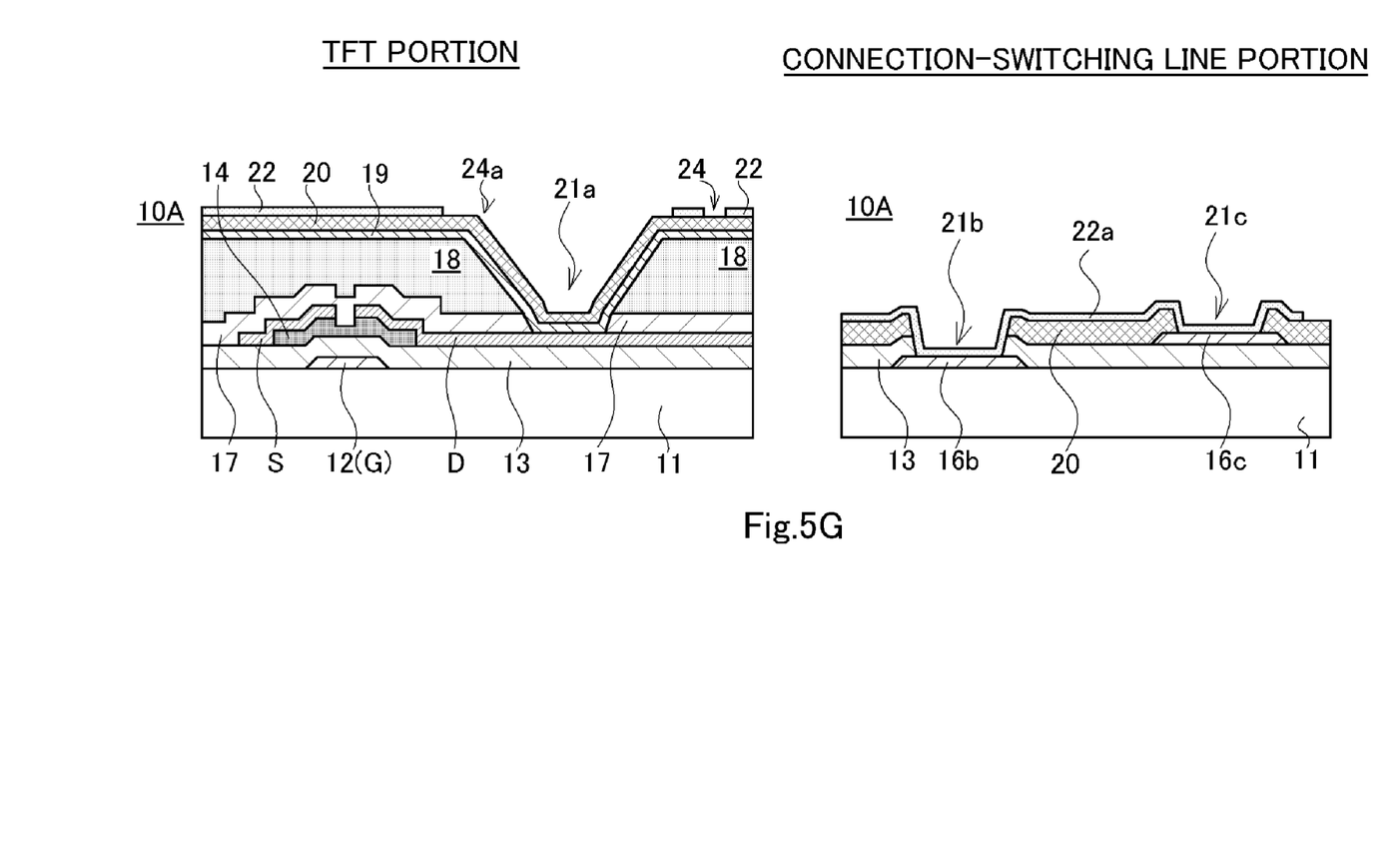
Figure 6:
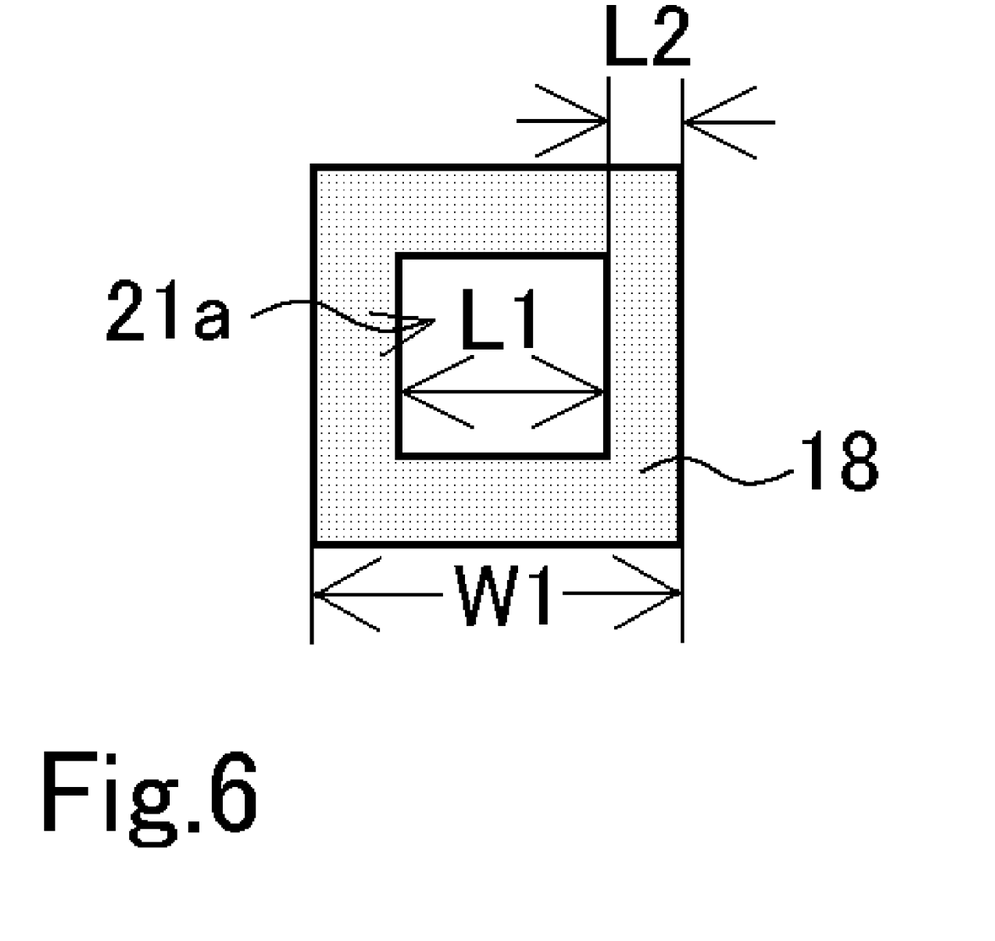
FIG. 6 is an enlarged plan view of the contact hole portion after undergoing a step in FIG. 5B.
Figure 7:
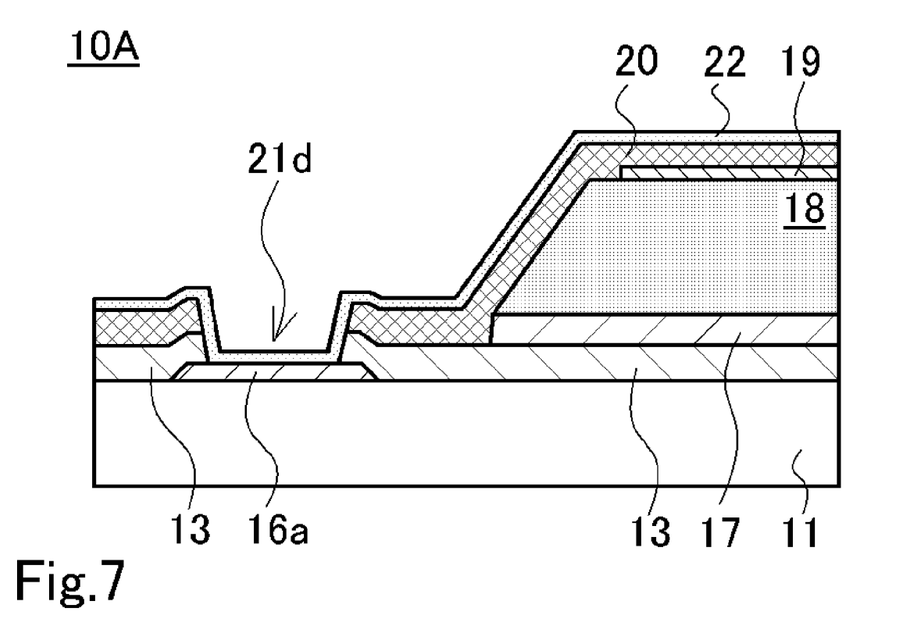
FIG. 7 is a cross-sectional view of the common wire portion after undergoing the seventh step of the embodiment.
Figure 8A:
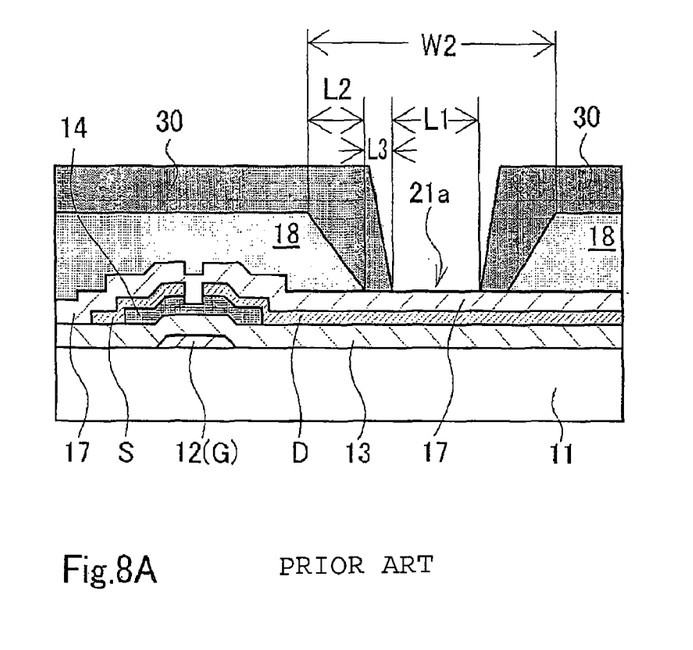
FIG. 8A is a cross-sectional view of a TFT portion after undergoing a second step of the comparative example.
Figure 8B:
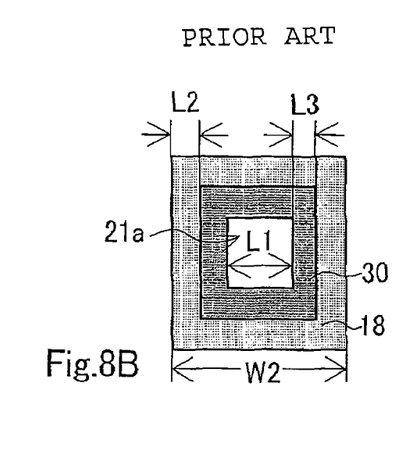
FIG. 8B is an enlarged plan view of the position where a contact hole is to be formed in FIG. 8A, and similarly
Figure 8C:
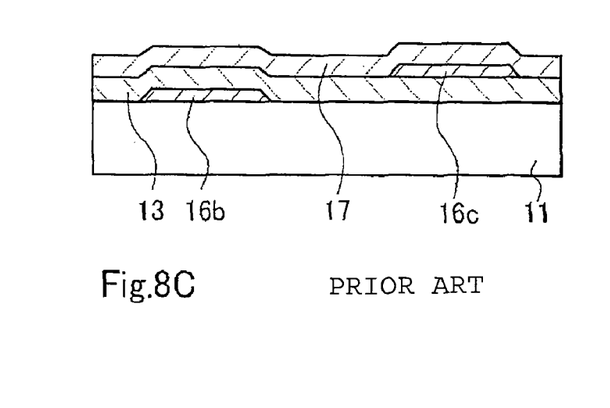
FIG. 8C is a cross-sectional view of a connection-switching line portion.
Figure 9A:
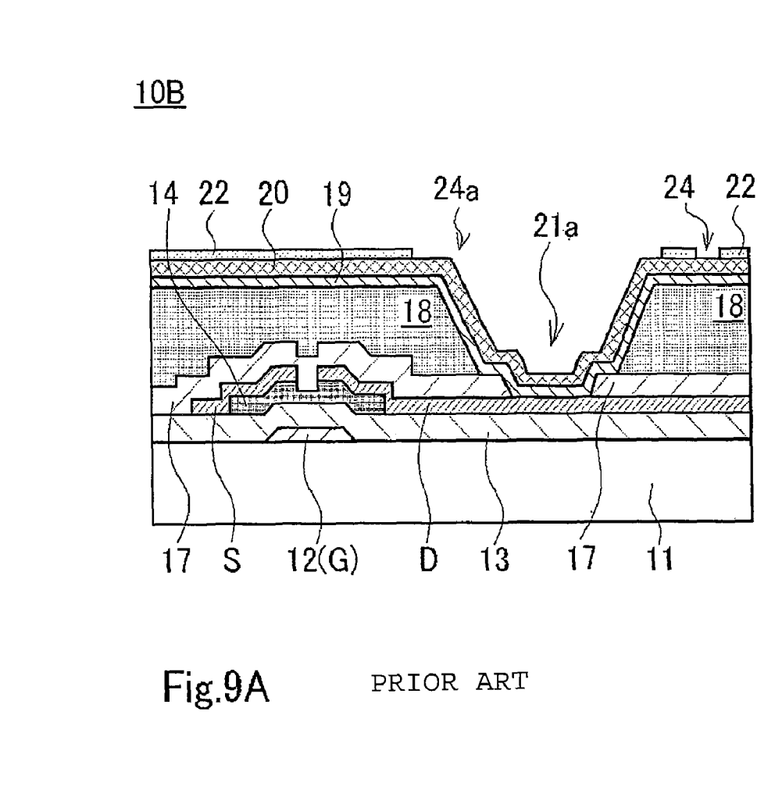
FIG. 9A is a cross-sectional view of a TFT portion after undergoing a seventh step of the comparative example, and similarly
Figure 9B:
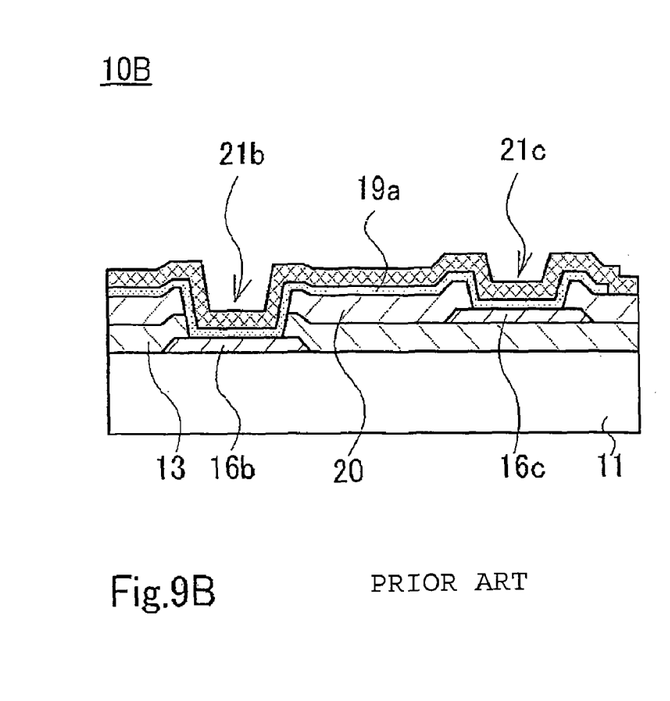
FIG. 9B is a cross-sectional view of a connection-switching line portion.

FIG. 1 is a drawing illustrating a position, common to the embodiment and the comparative example, of a connection between a common wire and common electrodes in a liquid crystal display device. FIG. 2 is a schematic plan view of two pixels of an array substrate in the liquid crystal display device of the embodiment. FIG. 3 is a schematic cross-sectional view along line III-III in FIG. 2. FIG. 4 is a schematic cross-sectional view along line IV-IV in FIG. 2. FIGS. 5A to G are cross-sectional views of a TFT portion and a common wire portion after undergoing various steps in the embodiment. FIG. 6 is an enlarged plan view of a contact hole portion after undergoing a step in FIG. 5B. FIG. 7 is a cross-sectional view of the common wire portion after undergoing the seventh step of the embodiment. FIG. 8A is a cross-sectional view of a TFT portion after undergoing a second step of the comparative example, FIG. 8B is an enlarged plan view of the position where a contact hole is to be formed in FIG. 8A, and similarly FIG. 8C is a cross-sectional view of a connection-switching line portion. FIG. 9A is a cross-sectional view of a TFT portion after undergoing a seventh step of the comparative example, and similarly FIG. 9B is a cross-sectional view of a connection-switching line portion.

Exemplary Embodiment

A liquid crystal display device 10A of an exemplary embodiment will now be described in the order of the manufacturing steps, using FIGS. 1 to 7. The TFT portion in FIGS. 5A to 5G is substantially equivalent to part of a partial cross-sectional view corresponding to FIG. 3, and the common wire portion therein is equivalent to a schematic cross-sectional view of portion Y in FIG. 1.

First Step

First of all, for the array substrate in the FFS mode liquid crystal display device 10A of this embodiment, a conductive layer of, say, aluminum, aluminum alloy or the like is formed over the entire surface of a transparent substrate 11, such as a glass substrate. After that, by means of well-known photolithographic and etching methods, multiple scan lines 12 are formed in a display area $D_{isp}$ so as to be parallel to one another, and a common wire 16a (see FIG. 7) and a gate wire 16b are formed at the periphery of the display area $D_{isp}$ (referred to as a rim region $T_{rim}$ below). The gate wire 16b will not necessarily be used as a wire for the scan lines 12—being termed a "gate wire" due to being of the same material as the scan lines 12—and can be used for various wiring as appropriate. This gate wire 16b corresponds to the "lower wire" in the preceding description of the invention. The common wire 16a is formed thicker than the other wires, in such a manner as to surround the outer periphery of the display area except for one peripheral portion where the driver IC and various terminals are disposed.

Next, the whole surface is covered with a gate insulator 13 constituted of a silicon nitride layer or a silicon oxide layer. After that, the entire surface of the gate insulator 13 is covered with a layer of, say, amorphous silicon ("a-Si" below) by means of the CVD method, and likewise, a semiconductor layer 14 constituted of an a-Si layer is formed in the TFT formation regions by means of photolithographic and etching methods. The sections of the scan lines 12 at the positions where the semiconductor layer 14 is formed constitute the TFT gate electrodes G.

Next, the entire surface of the transparent substrate 11 with the semiconductor layer 14 formed thereon is covered with a conductive layer constituted of aluminum, aluminum alloy or the like. Further, photolithography and etching are performed on such conductive layer so as to form: in the display area $D_{isp}$, signal lines 15 that include source electrodes S and cross over the scan lines 12; in the TFT formation regions, drain electrodes D; and at the rim region $T_{rim}$, a source wire 16c. The source wire 16c will not necessarily be used as wiring for the signal lines 15—being termed a "source wire" due to being of the same material as the signal lines 15—and can be used for various wiring as appropriate. This source wire 16c corresponds to the "upper wire" in the preceding description of the invention.

Both the source electrode S portions and the drain electrode D portions of the signal lines 15 partially overlap the surface of the semiconductor layer 14. Then the entire surface of the transparent substrate 11 obtained above is covered with a passivation layer 17. A layer of either silicon nitride or silicon oxide can be used for the passivation layer 17, but in the interest of insulation quality a silicon nitride layer will be preferable. The passivation layer 17 corresponds to the first insulator in the preceding description of the present invention. The surface of the common wire 16a also is covered by the gate insulator 13 and the passivation layer 17, though this is omitted from the drawings. FIG. 5A shows cross-sectional views of a TFT portion and a connection-switching line portion after undergoing the first step.

Second Step

Next, a planarization film layer is formed over the entire surface of the transparent substrate 11, then by means of exposure and development there is formed in the display area a planarization layer 18 of a particular thickness which does not cover the display area's peripheral portions and in which openings are formed over the drain electrodes D at the positions where the contact holes 21a are to be formed. FIG. 5B shows a cross-sectional view of a TFT portion, and a cross-sectional view of a connection-switching line portion and a position where a contact hole 21a is to be formed, after undergoing the second step. Denoting as L1 the width of the opening for the first contact hole 21a at the passivation layer 17, and as L2 the width of the mouth taper portions formed in the planarization layer 18, the width W1 of the mouth portion formed in the planarization layer 18 will be W1=L1+2×L2. The structure of the common wire 16a at this point is similar to that of the gate wire 16b portion shown in FIG. 5B.

Third Step

Next, using a fluorine gas, of which typical examples are $SF_6$ and $CF_4$, as the etching gas, plasma etching is carried out to etch away the exposed portions of the passivation layer 17. Conditions are selected and applied under which, using such fluorine etching gas, the silicon nitride, silicon oxide or other silicon-based compound is etched selectively while the planarization layer 18, drain electrodes D and source wires 16c are not susceptible to being etched. In this step, the planarization layer 18 acts as a mask for the etching of the passivation layer 17, so that the opening formed in the planarization layer 18 and the opening formed in the passivation layer 17 are joined continuously, and consequently no multilevel occurs in the first contact holes 21a.

Moreover, in such third step, there is no need—which there is in the related art manufacturing process—to consider mask superpositioning error or the like, so that the opening formed in the planarization layer 18 can be made large, and furthermore there is no need for the photolithographic process and photoresist layer peeling processes that are necessary in the related art manufacturing process. Note that in such third step, the passivation layer 17 at the peripheral portions of the display area $D_{isp}$ is also etched away. FIG. 5C shows cross-sectional views of a TFT portion and a connection-switching line portion after undergoing the third step. The structure of the common wire 16a at this point is similar to that of the gate wire 16b portion shown in FIG. 5C.

Fourth Step

Next, a lower-level transparent conductive layer constituted of ITO or IZO is laid, and first electrodes 19 are formed in a particular pattern in the pixel spaces delimited by the scan lines 12 and signal lines 15 of the display area $D_{isp}$, by means of photolithographic and etching methods. Each first electrode 19 in each pixel space is electrically connected to a drain electrode D via a first contact hole 21a. In the liquid crystal display 10A of the embodiment, these first electrodes 19 correspond to the pixel electrodes. FIG. 5D shows cross-sectional views of a TFT portion and a connection-switching line portion after undergoing the fourth step. The structure of the common wire 16a portion at this point is similar to that of the gate wire 16b portion shown in FIG. 5D.

Fifth Step

Further, a second insulator 20 constituted of a silicon nitride layer or a silicon oxide layer is formed with a particular thickness over the entire surface of the transparent substrate 11 with the first electrodes 19 formed thereon. This second insulator 20 is formed under more moderate conditions—what are termed low temperature film formation conditions—than the conditions for formation of the gate insulator 13, passivation layer 17 and so forth, in order to prevent the surfaces of the planarization layer 18, first electrodes 19 and so forth from being roughened. FIG. 5E shows cross-sectional views of a TFT portion and a connection-switching line portion after undergoing the fifth step. The structure of the common wire 16a at this point is similar to that of the gate wire 16b portion shown in FIG. 5E.

Sixth Step

Subsequently, a photoresist layer is applied over the entire surface of the transparent substrate 11 with the second insulator 20 formed thereon, and exposure and development are carried out using a mask so patterned that the positions where the second to fourth contact holes are to be formed are exposed. More precisely, the photoresist layer 30 after development is formed so that the positions where the second contact holes 21b for the gate wire 16b are to be formed, the positions where the third contact holes 21c for the source wire 16c are to be formed, and the positions where the fourth contact holes 21d for the common wire are to be formed, are exposed as viewed from above. FIG. 5F shows cross-sectional views of a TFT portion and a connection-switching line portion after undergoing the sixth step. The structure of the common wire 16a at this point is similar to that of the gate wire 16b portion shown in FIG. 5F.

Seventh Step

Next, plasma etching is carried out using the photoresist layer as a mask, to etch away the exposed portions of the second insulator 20 and peel away the photoresist. As a result of such plasma etching and photoresist peeling, the gate insulator 13 and second insulator 20 over the gate wire 16b and common wire 16a are removed, and the second insulator 20 over the source wire 16c is removed, forming the second to fourth contact holes 21b to 21d respectively.

Next, the entire surface of the transparent substrate 11 is covered with a transparent conductive material constituted of ITO or IZO. Thereby, the transparent conductive material covers the surface of the second insulator at the first contact holes 21a, and covers the surface of the common wire 16a at the fourth contact holes 21d. Then, by means of photolithographic and etching methods, multiple slits 24 for generating a fringe field effect are formed, and also the transparent conductive material inside the first contact holes 21a is removed so as to form slits 24*a*, as shown in FIGS. 2 and 3. Also, at the fourth contact holes 21*d* the patterning is such that the second electrodes 22 extend over the edge of the planarization layer 18 and the surface of the passivation layer 17, and cover the surface of the common wire 16*a*. After that, an alignment layer (not shown in the drawings) is provided over the entire surface of the second electrodes 22, and thereby the liquid crystal display device 10A of the embodiment is completed. FIG. 5G shows cross-sectional views of a TFT portion and a connection-switching line portion after undergoing the seventh step, and FIG. 6 shows a cross-sectional view of a common wire portion after the seventh step.

For the color filter substrate, omitted from the drawings, that is opposed to the foregoing array substrate, an item essentially the same as the color filter substrate for FFS mode liquid crystal display devices of the related art can be used. More precisely, on the color filter substrate there will be formed color filter layers for various colors in positions opposed to the first electrodes 19 functioning as pixel electrodes, and on the surface of the color filter layers there will be provided an alignment layer. Also, in positions that are opposed to the scan lines 12 and signal lines 15, and positions that are opposed to the TFTs, between the color filter layer and the transparent substrate, there will be provided respective black matrixes. Finally, the foregoing array substrate and color filter substrate will be opposed to each other and bonded together, and the interior space therebetween will be filled with liquid crystal. Thereby, the liquid crystal display device 10A of the embodiment will be obtained.

With such manufacturing method for the liquid crystal display device 10A of the embodiment, in the second step, openings are formed in the planarization layer 18 so as to expose the passivation layer 17, and in the third step plasma etching is employed directly to selectively etch away the exposed portions of passivation layer 17 and form openings thereat. The planarization layer 18 acts as a mask for the etching of the passivation layer 17, so that the opening in the planarization layer 18 and the opening formed in the passivation layer 17 are joined continuously, and consequently no multilevel such as in the related art occurs inside the first contact holes 21*a*. Moreover, in the third step there is no need—which there is in the related art manufacturing process—to consider mask superpositioning error, etc., and therefore the size of the opening formed in the planarization layer 18 can be made small, and furthermore there is no need for the photolithographic process and photoresist peeling process that are necessary in the related art manufacturing process. Consequently, when the manufacturing method for a liquid crystal display device of the present invention is employed, the number of manufacturing processes can be made smaller than in the related art, and a liquid crystal display device will be obtained that has a broad display area and is capable of bright displays.

Although in the foregoing embodiment, aluminum or aluminum alloy is used for the scan lines 12, signal lines 15, common wire 16*a*, gate wires 16*b* and source wires 16*c*, these items could alternatively be of a multilayer structure with a molybdenum layer formed over their surface. Also the common wire 16*a*, although formed on the surface of the transparent substrate 11 in the foregoing embodiment, could alternatively be formed on the surface of the gate insulator 13. Further, although the second electrode portions inside the first contact holes 21*a* are etched away in the embodiment, there would be no objection to allowing such portions of the second electrodes to remain. Also, although the first contact holes 21*a* are shown as being square-shaped, they could alternatively be round.

COMPARATIVE EXAMPLE

The structure of a liquid crystal display device 10B of the related art will now be described using FIGS. 8 and 9, as a comparative example for the purpose of verifying the advantages of the liquid crystal display device of the invention and demonstrating the unique structure thereof. FIGS. 8A and 8C illustrate the structure of portions corresponding respectively to those of the embodiment in FIG. 5B, while FIG. 8B illustrates the structure of a portion corresponding to that of the embodiment in FIG. 6. Further, FIGS. 9A and 9B illustrate the structure of portions corresponding respectively to those of the embodiment in FIG. 5G. Also, the elements in FIGS. 8 and 9 that are structurally identical to those in FIGS. 1 to 7 are assigned the identical reference numerals and detailed descriptions thereof are omitted.

The first step of the manufacturing process for the liquid crystal display device 10B of the comparative example is the same as that for the liquid crystal display device 10A of the embodiment. Subsequently in the manufacturing of the liquid crystal display device 10B of the comparative example, the planarization layer 18 is formed. But to reduce the number of manufacturing processes, when patterning of the planarization layer 18 is carried out a photolithographic method is used to remove in advance the photosensitive resin at the positions where the first contact holes 21*a* are to be formed and at the periphery of the display area, as shown in FIGS. 8A and 8B. More precisely, in the comparative example the photoresist layer 30 on the sidewalls inside the opening formed in the planarization layer 18 is allowed to remain, in order to dry etch the exposed portions of the passivation layer 17 at the positions where the first contact holes 21*a* are to be formed.

When formation is carried out in this manner so as to have the photoresist layer 30 left remaining at the positions where the first contact holes 21*a* are to be formed, it is necessary to allow a margin for mask superpositioning error during exposure, and therefore it is necessary to make the size of the opening formed in the planarization layer 18 large. More precisely, denoting as L1 the width of the opening formed in the passivation layer 17, and as L2 the width of the taper portions in the planarization layer 18 (in the same way as in the embodiment), and furthermore denoting as L3 the margin for mask superpositioning error during exposure, the width W2 of the opening formed in the planarization layer 18 in the liquid crystal display device 10B of the comparative example needs to be W2=L1+2×L2+2×L3, as shown in FIGS. 8A and 8B. Consequently, the width W2 of the opening formed in the planarization layer 18 of the comparative example, which allows for a margin for mask superpositioning error during exposure, is larger than the width L1 of the embodiment by the amount 2×L3. With such large width of the opening formed in the planarization layer 18, the contact hole portions formed in the liquid crystal display device do not constitute effective image display regions, and this is why a large fall has appeared in the opening of the high-definition liquid crystal display devices of recent years.

Next, the manufacturing of the liquid crystal display device in the comparative example proceeds via a step that forms the first electrodes and steps that form the second insulator and the second electrodes, in the same manner as in the embodiment described above. FIGS. 9A and 9B show cross-sectional views of a TFT portion and a connection-switching line portion in the liquid crystal display device 10B of the comparative example. The cross-section of the common wire portion in the liquid crystal display device 10B of the comparative example is essentially the same as that shown in FIG. 7. In the liquid crystal display device 10B of the comparative example, a multilevel 25 occurs at the boundary of the passivation layer 17 and planarization layer 18 inside the first contact holes 21a. Also, a connection-switching line 19a is formed from material of the same composition as the first electrodes 19 and moreover, the surface of the connection-switching line 19a is covered by the second insulator 20.

Thus, there are the following structural differences between the comparative-example liquid crystal display device 10B fabricated in the foregoing manner, which is equivalent to the related art case, and the liquid crystal display device 10A of the embodiment:

(a) The connection-switching line 22a of the embodiment is formed from transparent conductive material of the same composition as the second electrodes 22, whereas the connection-switching line 19a of the comparative example is formed from transparent conductive material of the same composition as the first electrodes 19.

(b) The connection-switching line 22a of the embodiment is formed on the surface of the second insulator 20, whereas the connection-switching line 19a of the comparative example is formed below the second insulator.

(c) No multilevel occurs inside the first contact holes 21a of the embodiment, whereas a multilevel 25 does occur inside the first contact holes 21a of the comparative example.

As a result of such structural differences due to differences in the manufacturing processes, with the liquid crystal display device 10A of the embodiment of the invention the size of the mouths of the first contact holes can be rendered small compared with items of the related art, and furthermore there is no need for the photolithographic process and photoresist peeling process that are necessary for formation of the first contact holes 21a in the related art manufacturing process. Hence, with the liquid crystal display device 10A of the invention, the number of manufacturing processes can be made smaller than in the related art, and moreover a broad display area is obtained that is capable of bright displays.

Above, the manufacturing process for a liquid crystal display device 10A has been set forth as an embodiment of the invention. Such a liquid crystal display device of the invention can be used in various electronic equipment such as personal computers, mobile telephones, portable data terminals, portable music players, portable televisions and so forth.

What is claimed is:

1. A liquid crystal display device comprising:
a liquid crystal layer; and
a pair of transparent substrates that enclose the liquid crystal layer; wherein
the liquid crystal layer face of one of such pair of transparent substrates being provided with:
multiple scan lines and signal lines that are formed in matrix layouts in a display area;
switching elements that are provided near intersections of the multiple scan lines and signal lines;
a first insulator that covers surfaces of the switching elements;
a planarization layer that is formed over the entire surface of the display area;
first electrodes, and second electrodes with multiple slits, that are constituted of transparent electrically conductive material that are disposed opposing each other on the planarization film with a second insulator interposed; and
lower wires that are constituted of the same material as the scan lines formed at peripheral portions of the display area, and upper wires that are constituted of the same material as the signal lines formed at peripheral portions of the display area; wherein
the switching elements being covered by the first insulator and moreover the upper wire being covered by the second insulator;
a connection-switching line for electrically connecting the lower wire and the upper wire; wherein
the connection-switching line being formed from transparent conductive material of the same composition as the second electrodes, and moreover extending over the surface of the second insulator and electrically connecting the upper wire and the lower wire via second contact holes formed in the second insulator laid over the upper wire and third contact holes formed in the first and second insulators laid over the lower wire.

2. The liquid crystal display device according to claim 1, wherein the first electrodes are electrically connected to electrodes of the switching elements via first contact holes formed on the planarization layer, and the second electrodes are formed over the whole of the display area and moreover are electrically connected to a common wire formed at the peripheral portions of the display area.

* * * * *